United States Patent Office 3,749,637
Patented July 31, 1973

3,749,637
LAMINATES CONTAINING CROSS-LINKED ETHYLENE/CARBOXYLIC ACID COPOLYMER ADHESIVES
Joseph Edward Reardon and Vernon Clare Wolff, Jr., Wilmington, Del., assignors to E. I. du Pont de Nemours and Company, Wilmington, Del.
No Drawing. Original application July 19, 1968, Ser. No. 745,956, now abandoned. Divided and this application Jan. 20, 1971, Ser. No. 108,159
Int. Cl. B32b 27/38, 27/42
U.S. Cl. 161—184    5 Claims

ABSTRACT OF THE DISCLOSURE

A laminate comprises at least two substrates and an adhesive having wet adhesion and heat resistance, especially two flexible substrates. The adhesive comprises a partially neutralized copolymer of ethylene and an alpha-beta ethylenically unsaturated carboxylic acid cross-linked with an epoxy resin of amino-formaldehyde resin.

CROSS REFERENCE TO RELATED APPLICATION

This application is a division of pending application Ser. No. 745,956, filed July 19, 1968, now abandoned.

BACKGROUND OF INVENTION

Field of invention

This invention relates to laminates, aqueous dispersions for applying the laminate adhesive to a substrate and a process for coating the substrate.

Prior art

Ethylene/alpha-beta ethylenically unsaturated carboxylic acid copolymer dispersions wherein part of the acid units are neutralized are disclosed in U.S. Pat. 3,296,172 issued to Dennis L. Funck and Vernon C. Wolff, Jr. on Jan. 3, 1967. These dispersions have a variety of coating uses; however, the adhesion of the partially neutralized ethylene copolymer to a variety of substrates decreases markedly when submitted to high humidity or water-soaking conditions. Also, a laminate of aluminum foil to paper employing the partially neutralized ethylene copolymer as the adhesive will heat-check (wrinkling of the foil) when heat-sealed under moderate conditions. The heat-checking or wrinkling of an aluminum foil laminate is thought to be directly related to the thermoplasticity of the adhesive. It is therefore desirable to provide an adhesive of the partially neutralized ethylene copolymer having wet adhesion and heat resistance while retaining the excellent moisture-barrier properties of the partially neutralized ethylene copolymer.

SUMMARY OF THE INVENTION

According to the present invention there is provided a laminated article comprising: at least two substrates and an adhesive therebetween of an ethylene/alpha-beta ethylenically unsaturated carboxylic acid copolymer which comprises about 55 to 97% by weight of ethylene and about 3 to 45% by weight of the alpha-beta ethylenically unsaturated carboxylic acid, about 5 to 75% of the acid groups neutralized, cross-linked with about 1 to 25% by weight, based on the weight of copolymer, of an epoxy resin or an amino-formaldehyde resin.

There is also provided a process for coating a substrate comprising: adding about 1 to 25% by weight, based on the weight of copolymer, of a cross-linking agent selected from the group consisting of an epoxy resin and an aminoformaldehyde resin and about 1 to 25% by weight, based on total polymer solids of a cross-linking catalyst to an aqueous dispersion of an ethylene/alpha-beta ethylenically unsaturated carboxylic acid copolymer which comprises about 55 to 97% by weight of ethylene and about 3 to 45% by weight of the alpha-beta ethylenically unsaturated carboxylic acid, about 5 to 75% of the acid groups neutralized; applying the dispersion as a coating on at least one surface of a substrate; and drying the coating to cross-link the copolymer with the epoxy resin or amino-formaldehyde resin.

Further, there is provided an aqueous dispersion comprising: an ethylene/alpha-beta ethylenically unsaturated carboxylic acid copolymer which comprises about 55 to 97% by weight of ethylene and about 3 to 45% by weight of the alpha-beta ethylenically unsaturated carboxylic acid, about 5 to 75% of the acid groups neutralized, about 1 to 25% by weight, based on the weight of the copolymer, of a cross-linking agent selected from the group consisting of an epoxy resin and an amino-formaldehyde resin and about 1 to 25% by weight, based on total polymer solids, of a cross-linking catalyst, the solids content of the dispersion being from about 20 to 60% by weight.

DETAILED DESCRIPTION OF THE INVENTION

The partially neutralized ethylene/alpha-beta ethylenically unsaturated carboxylic acid copolymer, referred to as an ionomer, can be prepared as disclosed in U.S. Pat. 3,264,272 issued to Richard W. Rees on Aug. 2, 1966. Dispersions of these copolymers can be prepared as disclosed in U.S. Pat. 3,296,172. In general, the neutralized copolymer is prepared from a copolymer of ethylene with from 3 to 45% by weight of an alpha-beta ethylenically unsaturated carboxylic acid, which can be made by grafting, but preferably by copolymerizing the ethylene and the carboxylic acid to give a copolymer in which the acid units are randomly distributed along the copolymer chain. Preferably, the acid has from 3 to 8 carbon atoms. Suitable acids are the mono- and di-carboxylic acids, including compounds convertible thereto in the polymer chain, such as acrylic, methacrylic, maleic and fumaric acids and the monoalkyl esters thereof and maleic anhydride. The preferred copolymer is of ethylene with about 5 to 15% by weight of acrylic or methacrylic acid. However, the copolymer is not limited to the ethylene and acid monomers described; other ethylenically unsaturated copolymerizable monomers which do not adversely affect the basic properties of the copolymer can be used. Such third monomers are described in U.S. Pat. 3,264,272. The acid copolymer is neutralized with sodium hydroxide as described in U.S. Pat. 3,296,172.

Particle size influences the coalescence of the dispersion and the quality of the coating, with small particles coalescing at lower temperatures. The higher the acid content in the ethylene/carboxylic acid copolymer, the greater the latitude for variation in the particle size and in the neutralization for a given coalescing temperature.

The amino-formaldehyde, preferably melamine-formaldehyde or urea-formaldehyde, and epoxy resin cross-linking agents employed are those generally known in the art and available commercially. These resins are usually employed in the disperison at a level of about 1 to 25% by weight, based on the weight of the copolymer, and preferably from about 2.5 to 10%. For best results, about 7.5% of melamine-formaldehyde is used, and for the epoxy resin about 5.5% is used.

The cross-linking catalyst added to the dispersion for cross-linking the polymers will depend on the cross-linking resin used. If an amino-formaldehyde resin such as melamine-formaldehyde is used, an aqueous catalyst solution of an ammonium salt of an acid, preferably of a mineral acid, is added so as to provide about 1 to 25%, preferably about 5 to 15% by weight, based on total polymer solids, of the salt in the dispersion. Typical salts are ammonium halides such as ammonium chloride and ammonium bromide, ammonium nitrate, ammonium sulfate and ammonium phosphates. With these catalysts, a stable, partially neutralized ethylene/carboxylic acid copolymer and melamine-formaldehyde dispersion is prepared by adjusting the pH of the resulting dispersion to at least 10, preferably about 10, with aqueous ammonia, e.g., with ammonium hydroxide, before the catalyst is added. This insures against premature cross-linking which results in decreased shelf stability of the dispersion and also against coagulation which would occur upon addition of the catalyst. The pH of the catalyst solution should also be adjusted to at least 10 with aqueous ammonia. The ammonium salt catalysts function as latent catalysts in that the drying of a coating prepared from the dispersion liberates ammonia so as to leave the mineral acid to function as the actual catalyst for cross-linking the partially neutralized ethylene/carboxylic acid copolymer and the melamine-formaldehyde.

If an epoxy resin is added as the cross-linking agent, a polybasic organic amine is added to the dispersion so as to provide about 1 to 25%, preferably about 5 to 15% by weight, based on total polymer solids, of the amine in the dispersion. Typical amines are those known by one versed in the art such as mono-, di- and tribasic amines used for years in the crosslinking of epoxy resins.

Preferred amines are diphenyl amine, diethylene triamine, ethylene diamine, tetraethylene pentamine, triethylene tetramine, metaphenylene diamine, methylene dianiline, and various trade-name catalysts such as the "Epon" curing agents and the Ciba hardeners, in particular 950 and 951. In order to insure a quality dispersion of the partially neutralized ethylene copolymer and the epoxy resin, the copolymer dispersion is added slowly to the epoxy resin dispersion until inversion occurs, i.e., rapid decrease in viscosity, and then this mixture is added to the remaining copolymer dispersion.

The catalyzed reaction cross-linking the epoxy resin and partially neutralized ethylene copolymer, once initiated by heat upon drying, will continue to react at room temperature due to the catalytic effect of the partially neutralized ethylene copolymer molecule. Therefore, although laminates prepared using this composition as the adhesive may heat-check at moderate temperatures immediately after being prepared, aging will render these laminates heat resistant. Effects due to aging can be noted after one or two weeks, and by selecting the appropriate catalyst, acid content and nutralization of the copolymer and reaction conditions, delayed heat resistance can be accomplished for any desired time.

Any two or more substrates can be laminated using the dispersion of the present invention as the laminating adhesive. The substrates can be wood, metal, vitreous or synthetic polymeric film; however, flexible substrates are preferred. Such flexible substrates are polyolefin films such as polyethylene or polypropylene film which have preferably been treated to effect adherability such as by the well-known flame and electrical-discharge treatments, polyester film, nylon film, polyvinylidene chloride film, polyvinyl chloride film, aluminum foil, cellulosics such as paper and regenerated cellulose and fiber glass.

When aluminum foil is one of the substrates, ammonium nitrate used either alone or in combination with another ammonium salt is preferred as the catalyst for the partially neutralized ethylene copolymer/melamine-formaldehyde systems to provide improved adhesion to the aluminum foil. Where vitreous substrates such as glass are used, the catalyst can be eliminated where high temperature curing (200° C.) can be employed.

Since partially neutralized ethylene/methacrylic acid copolymer dispersions do not adhere under any circumstances to polyester, nylon, and flame-treated polypropylene film and the ethylene/methacrylic acid copolymer-melamine formaldehyde coatings should be sufficiently cured to adhere to these substrates, it is theorized that a chemical interaction between the partially neutralized ethylene/methacrylic acid copolymer, melamine-formaldehyde, and treated substrate is envisioned as the cause for this adhesion. This postulation is substantiated by (a) the resulting moisture insensitivity of the construction and (b) an infrared spectroscopic study. The complete retention of adhesion after being submitted to a variety of aqueous environmentes indicates a chemical bond is occurring at the interface. Strictly ionic or electrostatic bonds, on the other hand, would be dependent upon the dielectric constant of the media and one would expect a marked decrease in adhesion when subjected to high humidity or aqueous conditions.

To substantiate this theory, the reaction between the partially neutralized ethylene/methacrylic acid copolymer and melamine-formaldehyde was followed (Table I) by infrared analysis. Dispersions of the partially neutralized ethylene/methacrylic acid, melamine-formaldehyde, and catalyst were cast on fluorocarbon film and dried at 115°, 150°, and 170° C. for various times. A band at 5.75μ

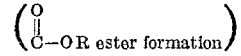

appeared, and its intensity was observed to increase with cure time, whereas the carboxylic acid band (6.4μ) relative intensity decreased. An absorption peak at 6.80μ was used as the internal standard with the absolute intensities of the other bands being compared to this absorption.

TABLE I.—INFRARED SPECTROSCOPIC INVESTIGATION OF THE REACTION BETWEEN PARTIALLY NEUTRALIZED E/MAA AND MELAMINE-FORMALDEHYDE

| Dispersion | Drying conditions | | Relative intensities of bands | |
|---|---|---|---|---|
| | Temp., °C. | Time, sec. | 5.75μ/6.80μ | 6.40μ/6.80μ |
| 89/11 E/MAA (30% neutralized) plus 7.5% "Cymel" 301 | 115 | 30 | 0.13 | 0.89 |
| 89/11 E/MAA (30% neutralized) plus 7.5% "Cymel" 301 plus 7.5 wt. percent NH₄Br | 115 | 15 | 0.21 | 0.84 |
| Do | 115 | 30 | 0.27 | 0.80 |
| Do | 115 | 120 | 0.27 | 0.69 |
| Do | 150 | 10 | 0.20 | 0.92 |
| Do | 150 | 20 | 0.29 | 0.92 |
| Do | 150 | 60 | 0.32 | 0.82 |
| Do | 170 | 10 | 0.26 | 1.09 |
| Do | 170 | 20 | 0.25 | 1.07 |
| Do | 170 | 30 | 0.33 | 0.92 |
| Do | 170 | 40 | 0.36 | 0.89 |
| Do | 170 | 60 | 0.46 | 0.92 |
| Do | 170 | 120 | 0.47 | 0.92 |
| 89/11 E/MAA (20% neutralized) plus 7.5% "Cymel" 301 | 115 | 30 | 0.15 | 1.00 |
| 89/11 E/MAA (20% neutralized) plus 7.5% "Cymel" 301 plus 7.5 wt. percent NH₄Br | 115 | 15 | 0.21 | 0.96 |
| Do | 115 | 30 | 0.28 | 1.00 |
| Do | 115 | 120 | 0.27 | 0.86 |
| Do | 170 | 10 | 0.29 | 0.96 |
| Do | 170 | 20 | 0.33 | 1.00 |
| Do | 170 | 30 | 0.34 | 1.00 |
| Do | 170 | 40 | 0.39 | 0.92 |
| Do | 170 | 60 | 0.46 | 0.90 |

NOTE.—E/MAA=Ethylene/metharcylic acid copolymer, 6.8μ absorption, employed as internal standard.

The coatings applied from the dispersions of the present invention to the aforementioned substrates have the advantage of retention of adhesion when submitted to either high humidity or water soaking.

The invention can be further illustrated by the following examples wherein percentages are by weight unless otherwise indicated.

EXAMPLE 1

With gentle agitation, 120 grams of hexamethoxymethyl melamine ("Cymel" 301—American Cynamid) were added to 4000 grams of a dispersion of an ethylene/methacrylic acid (89/11 wt. percent) copolymer, 30% neutralized with sodium hydroxide and having a solids content of 42%. Enough (40 ml.) ammonium hydroxide was then added to bring the pH of the resulting dispersion to approximately 10.0. The resulting dispersion had a melamine-formaldehyde resin content of 7.5%, based on the total solids, and a solids content of 44%.

A 10% catalyst solution was prepared from 120 grams of ammonium bromide dissolved in 988 ml. of water and 92 ml. of ammonium hydroxide. Thirty grams (7.5% based on polymer solids) of the 10% aqueous ammonium bromide solution were slowly added at room temperature with good agitation to 100 grams of the above dispersion.

A flame-treated surface of a biaxially oriented polypropylene film was coated with this blend by means of a number 10 wire-wound bar and dried at 130° C. for 30 seconds in a forced air oven to give a coating weight of about 3.0 lbs./ream. Heat-seals were formed at 230° C. and 5 p.s.i.g. for 0.25 second in a Sentinel heat sealer Model 12–AS and heat-seal strengths were measured on an Instron tensile tester having a cross-head speed of 1 ft./min. The coating heat-seal was 230 gm./in. dry and resulted in film-tear (F.T.) adhesion (>230 gm./in.) when subjected to one hour of soaking in 45° C. water.

The adhesive-tape adhesion is determined by adhering a six-inch piece of one-inch wide 3 M "Scotch"-brand tape No. 612 to the coated surface. The tape is then peeled back by hand at a constant rate. This technique gives rise to three ratings of the adhesion of the coating to the substrate:

(a) poor—if the coating is lifted off the substrate;

(b) spotty—if the coating is partially lifted off the substrate;

(c) excellent—if the coating cannot be removed by the tape.

This coating was rated excellent.

Glass slides were dip coated with the above dispersion and air dried at 120° C. for 30 seconds. The adhesion to glass was good. The coated glass slides were laminated to polyethylene film 10 mils in thickness in a Preco press at 190° C. for six minutes at touch pressure. There was good adhesion (200–500 gm./in.) noted between the glass and polyethylene.

EXAMPLES 2 TO 11

These examples illustrate the effect that the nature and concentration of catalyst has upon the adhesion to flame-treated polypropylene film. In these examples, from 2.5 to 25% by weight, based on polymer solids, of dilute aqueous solutions of ammonium chloride, ammonium bromide, ammonium iodide, ammonium nitrate, diammonium phosphate, ammonium sulfate, and ammonium p-toluene sulfonate were added either alone or in various combinations to the partially neutralized ethylene/methacrylic acid copolymer-melamine-formaldehyde dispersion prepared as described in Example 1. Coatings were applied, dried, heat-sealed and tested as in Example 1. The results are shown in Table II.

TABLE II.—FLAME-TREATED POLYPROPYLENE FILM COATED WITH PARTIALLY NEUTRALIZED ETHYLENE/METHACRYLIC ACID COPOLYMER PLUS MELAMINE-FORMALDEHYDE PLUS CATALYST DISPERSIONS

| Example No. | "Cymel" 301 (wt. percent) copolymer based | Catalyst (wt. percent) polymer based | Co-catalyst (wt. percent) polymer based | Drying cond. | Heat-seal strength (gm./in.) Dry | Heat-seal strength (gm./in.) Wet | Adhesive tape adhesion |
|---|---|---|---|---|---|---|---|
| Control | Polyvinylidene chloride coated polypropylene | | | | F.T. | 14 | |
| 2 | 7.5 | 2.5 NH₄I | 7.5 (NH₄)₂HPO₄ | 110° C./30 seconds | F.T. | F.T. | Excellent. |
| 3 | 7.5 | 5 NH₄Br | 5 (NH₄)₂HPO₄ | do | 272 | 195 | Do. |
| 4 | 7.5 | 5 NH₄Br | 10 (NH₄)₂HPO₄ | do | 230 | 250 | Do. |
| 5 | 7.5 | 2.5 NH₄Br | 2.5 (NH₄)₂HPO₄ | do | 280 | 350 | Do. |
| 6 | 7.5 | 2.5 NH₄Br | 10 (NH₄)₂HPO₄ | do | 272 | 295 | Do. |
| 7 | 7.5 | 10 NH₄I | | 125° C./30 seconds | 226 | 180 | Do. |
| 8 | 7.5 | 5 NH₄NO₃ | | 115° C./30 seconds | | | Do. |
| 9 | 25.0 | 7.5 NH₄Cl | | 110° C./3 minutes | | | Spotty. |
| 10 | 12.5 | 25.0 NH₄Cl | | do | | | Excellent. |
| 11 | 12.0 | 12 NH₄PTSA | | 125° C./30 seconds | | | Do. |
| Control | | | | 130° C./30 seconds | 15 | ¹ None | Poor. |

¹ Delaminates.

The ammonium bromide and nitrate catalysts were found to be the most reactive and the optimum concentration was found to be between about 2.5 and 10% by weight based on the polymer content. For the "Cymel" 301 melamine-formaldehyde resin, best results were obtained at a concentration of about 7.5% by weight, based on total polymer content. When used much in excess of this amount, the resin would in time exude to the surface and give rise to poor heat-sealability and a haziness to the film.

EXAMPLES 12 TO 19

Following the procedure of Example 1, from 12.5 to 25% by weight of "Aerotex" M–3, American Cyanamid's melamine-formaldehyde resin, was used in place of "Cymel" 301. Various catalyst systems were used. Coatings were applied to flame-treated polypropylene, dried at 110° C./30 sec., heat-sealed and tested as in Example 1. The results are shown in Table III.

TABLE III.—FLAME-TREATED POLYPROPYLENE FILM COATED WITH PARTIALLY NEUTRALIZED ETHYLENE/METHACRYLIC ACID COPOLYMER PLUS MELAMINE-FORMALDEHYDE PLUS CATALYST DISPERSIONS

| Example No. | "Aerotex" M–3 (wt. percent) copolymer based | Catalyst (wt. percent polymer based) | Drying conditions | Aged | Heat seal conditions | Heat seal strength (gm./in.) Dry | Heat seal strength (gm./in.) Wet |
|---|---|---|---|---|---|---|---|
| 12 | 23 | 100 (NH₄)₂HPO₄ | 110° C./30 seconds | 110° C./5 minutes | 200° C./1 second/20 p.s.i.g | F.T. | 183 |
| 13 | 25 | 12.5 (NH₄)₂HPO₄ | do | do | do | 145 | 45 |
| 14 | 12.5 | 2.5 (NH₄)₂HPO₄ | do | do | 180° C./0.25 seconds/10 p.s.i.g | 200 | 126 |
| 15 | 12.5 | 5.0 (NH₄)₂HPO₄ | do | do | do | 216 | 140 |
| 16 | 12.5 | 7.5 (NH₄)₂HPO₄ | do | do | do | 227 | 145 |
| 17 | 12.5 | 10.0 (NH₄)₂HPO₄ | do | do | do | 182 | 152 |
| 18 | 12.5 | 12.5 (NH₄)₂HPO₄ | do | do | do | 173 | 227 |
| 19 | 12.5 | 5.0 (NH₄)Cl | do | do | do | 205 | 160 |
| Control | | | do | | do | 20 | None |

Although these compositions possessed good adhesion to flame-treated polypropylene, a larger concentration of "Aerotex" M–3 than was desirable was required.

EXAMPLES 20 TO 23

For Examples 20 and 22, the partially neutralized ethylene/methacrylic acid copolymer, "Cymel" 301 melamine-formaldehyde resin and NH₄Br catalyst dispersion of Example 1 was used to coat polyester (polyethylene terephthalate) film and polyvinylidene chloride (PVDC) coated polyester (polyethylene terephthalate) with 0.7, 1.0 and 2.3 lbs./ream of coating which was dried at 150° C. for 30 seconds in a forced air oven. The coated films were then laminated to polyethylene film in a Sentinel Heat Sealer (Model 12–AS) at 120° C. for one second at 10 p.s.i.g. Adhesion was tested as in Example 1 except wet adhesion was tested after one hour in boiling water.

For Examples 21 and 23, a higher free acid (19% neutralized) partially neutralized thylene/methacrylic acid copolymer was substituted for the 30% neutralized copolymer of Example 1. The dispersion was applied, dried and tested as above. The results are shown in Table IV.

TABLE V.—LAMINATING ADHESIVE FOR NYLON AND POLYETHYLENE TEREPHTHALATE FILM TO ALUMINUM FOIL OF A PARTIALLY NEUTRALIZED E/MAA COPOLYMER PLUS 7.5% "CYMEL" 301 PLUS CATALYST DISPERSIONS

| Example No. | Catalyst system | Film | Preco press data | | | Adhesion | |
|---|---|---|---|---|---|---|---|
| | | | Time (sec.) | Pressure (p.s.i.g.) | Temp. (200° C.) | Dry | Wet |
| 24 | 2.5% NH₄Br plus 2.5% NH₄NO₃ | Nylon | 30 | 2,000 | 200 | Very good | Good.[1] |
| 25 | 2.5% NH₄Br plus 2.5% NH₄NO₃ | do | 30 | 2,000 | 225 | Excellent (F.T.) | Very good.[1] |
| 26 | 2.5% NH₄Br plus 2.5% NH₄NO₃ | do | 30 | 2,000 | 250 | do | Good.[1] |
| 27 | 2.5% NH₄Br plus 2.5% NH₄NO₃ | Polyethylene terephthalate | 30 | 2,000 | 135 | do | Excellent(F.T.).[2] |
| 28 | 5.0% NH₄Br plus 2.5% (NH₄)₂SO₄ | do | 30 | 2,000 | 135 | do | Good.[2] |
| Control | | Nylon | 30 | 2,000 | 135 | No adhesion | No adhesion.[1] |
| Do | | Polyethylene terephthalate | 30 | 2,000 | 135 | do | Do.[2] |

[1] After 1 hour in boiling water.
[2] After 16 hours in 0.5% Ivory-soap solution.

NOTE.—E/MAA=Ethylene/methacrylic acid.

of about 3.0 lbs./ream. Laminates of the films and foil were prepared in a Preco Laboratory Press at various conditions. The results are shown in Table V.

EXAMPLE 29

A solution of 27 grams of "Epon" 830 (epichlorohydrin/bisphenol A-type epoxide) and 1.0 grams of polyoxypropylene polyoxyethylene condensate M.W. 1900–900 such as pluronic acid F–68 was heated at 50° C. by means of a warm water bath. A dispersion of an ethylene/methacrylic acid (89/11 wt. percent) copolymer 66% neutralized with sodium hydroxide and having a solids content of 40% was added slowly (dropwise) until the viscosity inverted (decreased rapidly). The remaining partially neutralized ethylene/methacrylic acid dispersion was then charged as one unit to provide a dispersion containing 5.5% by weight epoxy resin, based on the copolymer, and a solids content of 41%.

When ready to use, 5.5% (based on polymer solids) of

TABLE IV.—LAMINATING POLYETHYLENE TEREPHTHALATE FILM TO POLYETHYLENE

| Example No. | Polyester substrate | Dispersion | Approximate add-on weight (lbs./ream) | Heat seal strength (gm./in.) | |
|---|---|---|---|---|---|
| | | | | Dry | Wet |
| 20 | Uncoated | 30% neut. E/MAA plus 7.5% "Cymel" 301 plus 7.5% NH₄Br | 0.7 | 295 | 173 |
| | | | 1.0 | 520 | 680 |
| | | | 2.3 | 680 | 630 |
| 21 | do | 19% neut. E/MAA plus 7.5% "Cymel" 301 plus 7.5% NH₄Br | 0.7 | 610 | 127 |
| | | | 1.0 | 650 | 240 |
| | | | 2.3 | 770 | 435 |
| 22 | PVDC coated | 30% neut. E/MAA plus 7.5% "Cymel" 301 plus 7.5% NH₄Br | 0.7 | 520 | (¹) |
| | | | 1.0 | 520 | (¹) |
| | | | 2.3 | 540 | 50 |
| 23 | do | 19% neut. E/MAA plus 7.5% "Cymel" 301 plus 7.5% NH₄Br | 0.7 | 430 | (¹) |
| | | | 1.0 | 500 | (¹) |
| | | | 2.3 | 500 | 227 |
| Control | Uncoated and PVDC coated | 30% neut. E/MAA | 1.0 | (¹) | (¹) |
| Do | do | 19% neut. E/MAA | 1.0 | (¹) | (¹) |

[1] No adhesion.

NOTE.—E/MAA=Ethylene/methacrylic acid copolymer.

The dry and wet adhesion of the uncoated polyethylene terephthalate film to polyethylene was excellent, especially at 1 and 2.3 lbs./ream; whereas the PVDC coated polyethylene terephthalate film also had excellent dry adhesion but poor wet adhesion for the 30% neutralized copolymer and enhanced wet adhesion when the 19% neutralized copolymer was used.

EXAMPLES 24 TO 28

The dispersion of Example 1, with various catalysts, was used to laminate nylon film to aluminum foil and polyethylene terephthalate film to aluminum foil. The dispersion was applied to one surface of the aluminum foil and dried at 170° C./1 min. in a forced air oven to give a coating weight of about 3.0 lbs./ream (1.5 lbs./ream for the aluminum foil laminated to the polyethylene terephthalate film). The dispersion was applied to the nylon film and polyethylene terephthalate film and dried at 150° C./30 sec. in a forced air oven to give a coating weight a 22% solids solution of triethylene tetramine (catalyst) was added followed by enough viscosity improver such as "Acrysol" G–110 (ammonium polyacrylate solution) to raise the viscosity to approximately 1000 cps. using Brookfield viscometer #3 spindle at 60 r.p.m.

Laminates of 0.3 to 0.5 mil aluminum foil and bleached sulfite paper were prepared and dried at 170° C. for 10 seconds in a forced air oven. This laminate heat-checked (wrinkled) when heat-sealed at 375° F. at 10 p.s.i.g. for one second. It did not heat-check, however, when sealed at 500° F. at 10 p.s.i.g. for one second after aging seven days at room temperature before testing.

EXAMPLES 30 TO 36

Employing the same technique as that outlined in Example 29, dispersions were prepared using from 2.2 to 24.5% by weight based on copolymer solids of "Epon" 830 and from 2.2 ot 12.2 wt. percent triethylene tetramine. Also, the partially neutralized ethylene/methacrylic acid copolymer dispersion of Example 1 was substituted for the one in Example 29 and the procedure continued. The results are shown in Table VI.

TABLE VI.—LAMINATING ADHESIVES FOR PAPER-ALUMINUM FOIL CONSTRUCTIONS OF A PARTIALLY NEUTRALIZED E/MAA COPOLYMER PLUS EPOXY RESIN DISPERSIONS

| Example No. | 89/11 E/MAA | Epoxy resin (wt. percent) | Catalyst (wt. percent) | Viscosity (cps.) | Drying cond. Temp. (°C.) | Time (sec.) | Heat resistance temp./10 p.s.i.g./1 sec. (°F.) | Aging Time (days) | Heat resistance temp./10 p.s.i.g./1 sec. (°F.) |
|---|---|---|---|---|---|---|---|---|---|
| 30 | 66% neutralized | 11.5 | 11.5 | 926 | 170 | 8 | 375 | 6 | 500 |
| 31 | do | 2.2 | 2.2 | 1,090 | 170 | 10 | 350 | 5 | 425 |
| 32 | do | 24.5 | 12.2 | 1,160 | 170 | >60 | >500 | | |
| 33 | 30% neutralized | 11.5 | 11.5 | 1,200 | 170 | 11 | 350 | 5 | 400 |
| 34 | do | 5.5 | 5.5 | 1,040 | 170 | 9 | 325 | 5 | 375 |
| 35 | do | 2.2 | 2.2 | 1,084 | 170 | 8 | 325 | 4 | 350 |
| 36 | do | 24.5 | 24.5 | 966 | 170 | 14 | 475 | 1 | >500 |
| Control | do | None | None | 988 | 170 | 6 | 300 | 4 | 300 |
| Do | 66% neutralized | None | None | 978 | 170 | 10 | 350 | 2 | 350 |

NOTE.—E/MAA=Ethylene/methacrylic acid.

It can be seen from Table VI that the laminate using an adhesive of an unmodified partially neutralized ethylene/methacrylic acid copolymer does not improve in heat resistance after aging.

What is claimed is:
1. A laminated article comprising: at least two substrates and an adhesive therebetween of an ethylene/alpha-beta ethylenically unsaturated carboxylic acid copolymer which comprises about 55 to 97% by weight of ethylene and about 3 to 45% by weight of alpha-beta ethylenically unsaturated carboxylic acid selected from the group consisting of acrylic acid, methacrylic acid, maleic acid and monoalkyl esters thereof, fumaric acid and monoalkyl esters thereof, and maleic anhydride, about 5 to 75% of the acid groups neutralized, cross-linked with about 1 to 25% by weight, based on the weight of the copolymer, of a cross-linking resin selected from the group consisting of epichlorohydrin-bisphenol epoxy resins, urea-formaldehyde resins and melamine-formaldehyde resins.
2. The laminate of claim 1 wherein the substrates are flexible substrates.
3. The laminate of claim 1 wherein the copolymer is an ehtylene/methacrylic acid copolymer comprising about 85 to 95% by weight of ethylene and about 5 to 15% by weight of methacrylic acid, about 5 to 30% of the acid groups neutralized.
4. The laminate of claim 3 wherein the cross-linking resin is melamine-formaldehyde.
5. The laminate of claim 3 wherein the adhesive contains about 2.5 to 10% by weight of cross-linking resin.

References Cited

UNITED STATES PATENTS

| | | |
|---|---|---|
| 3,214,488 | 10/1965 | O'Donnell et al. __ 260—29.4 UA |
| 3,296,172 | 1/1967 | Funck et al. _____ 260—34.2 X |
| 3,337,482 | 8/1967 | Watanabe et al. __ 260—29.4 UA |
| 3,369,962 | 2/1968 | Hochner et al. __ 260—29.4 UA |
| 3,647,923 | 3/1972 | Hazen et al. _____ 161—247 X |

HAROLD ANSHER, Primary Examiner

U.S. Cl. X.R.

161—186, 250, 261